(12) United States Patent
Isobe

(10) Patent No.: US 11,007,615 B2
(45) Date of Patent: May 18, 2021

(54) MACHINE TOOL, MANAGEMENT SYSTEM, AND TOOL DETERIORATION DETECTION METHOD

(71) Applicant: Fanuc Corporation, Yamanashi (JP)

(72) Inventor: Gaku Isobe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/711,885

(22) Filed: Dec. 12, 2019

(65) Prior Publication Data
US 2020/0230758 A1   Jul. 23, 2020

(30) Foreign Application Priority Data
Jan. 21, 2019 (JP) .............................. JP2019-007451

(51) Int. Cl.
*B23Q 3/157* (2006.01)
*G01N 21/57* (2006.01)
(Continued)

(52) U.S. Cl.
CPC ..... *B23Q 3/15706* (2013.01); *B23Q 3/15526* (2013.01); *B23Q 3/15534* (2016.11); *B23Q 17/0904* (2013.01); *B23Q 17/2457* (2013.01); *G01B 11/303* (2013.01); *G01N 21/57* (2013.01); *B23Q 3/1554* (2013.01); *B23Q 3/15553* (2013.01); *B23Q 3/15733* (2013.01);
(Continued)

(58) Field of Classification Search
CPC ................ B23Q 17/09; B23Q 17/0904; B23Q 17/0909; B23Q 17/0914; G01B 11/30; G01B 11/303; G01B 21/30; G01N 21/57; Y10T 483/13; Y10T 483/132; Y10T 483/134; Y10T 483/136; Y10T 483/138; Y10T 483/14; Y10T 483/15
USPC ......... 483/7, 8, 9, 10, 11, 12, 13; 356/237.2, 356/600
See application file for complete search history.

(56) References Cited

U.S. PATENT DOCUMENTS

| | | | | |
|---|---|---|---|---|
| 5,517,027 A | * | 5/1996 | Nakagawa | ............. G01Q 20/02 850/1 |
| 6,542,248 B1 | * | 4/2003 | Schwarz | ............. G01B 11/303 356/446 |

(Continued)

FOREIGN PATENT DOCUMENTS

| | | | | |
|---|---|---|---|---|
| JP | H09-222361 A | | 8/1997 | |
| JP | 2006284531 A | * | 10/2006 | ............. G01B 11/08 |

(Continued)

*Primary Examiner* — Erica E Cadugan
*Assistant Examiner* — Michael Vitale
(74) *Attorney, Agent, or Firm* — Shackelford, Bowen, McKinley & Norton, LLP

(57) ABSTRACT

A machine tool includes: a tool magazine that stores a plurality of tools; a spindle that holds one of the plurality of tools stored in the tool magazine; a glossiness measurement unit that measures glossiness of a tapered outer surface of a taper shank of each of the plurality of tools; a deterioration determination unit that determines whether or not the tapered outer surface is deteriorated on the basis of the glossiness measured by the glossiness measurement unit; and a notification unit that notifies an operator of deterioration of the tapered outer surface if it is determined by the deterioration determination unit that the tapered outer surface is deteriorated.

10 Claims, 7 Drawing Sheets

(51) Int. Cl.
  *G01B 11/30* (2006.01)
  *B23Q 17/09* (2006.01)
  *B23Q 3/155* (2006.01)
  *B23Q 17/24* (2006.01)

(52) U.S. Cl.
  CPC ............ *B23Q 2003/155425* (2016.11); *Y10T 483/136* (2015.01); *Y10T 483/14* (2015.01); *Y10T 483/179* (2015.01)

(56) References Cited

U.S. PATENT DOCUMENTS

| | | | |
|---|---|---|---|
| 2011/0080588 A1* | 4/2011 | Segall | G01N 21/954 356/445 |
| 2016/0077515 A1* | 3/2016 | Pfeffer | G01B 11/2513 700/160 |
| 2016/0258865 A1* | 9/2016 | Kawano | G01N 21/57 |
| 2016/0318145 A1* | 11/2016 | Kawanishi | B23Q 17/2409 |
| 2019/0195624 A1* | 6/2019 | Kato | G01J 3/36 |

FOREIGN PATENT DOCUMENTS

| | | | | |
|---|---|---|---|---|
| JP | 2007-075924 A | | 3/2007 | |
| JP | 2015-131357 A | | 7/2015 | |
| JP | 2018086702 A | * | 6/2018 | |
| WO | WO-2015104945 A1 | * | 7/2015 | ........ B23Q 3/15513 |
| WO | WO-2019069933 A1 | * | 4/2019 | ............ G01B 11/24 |

\* cited by examiner

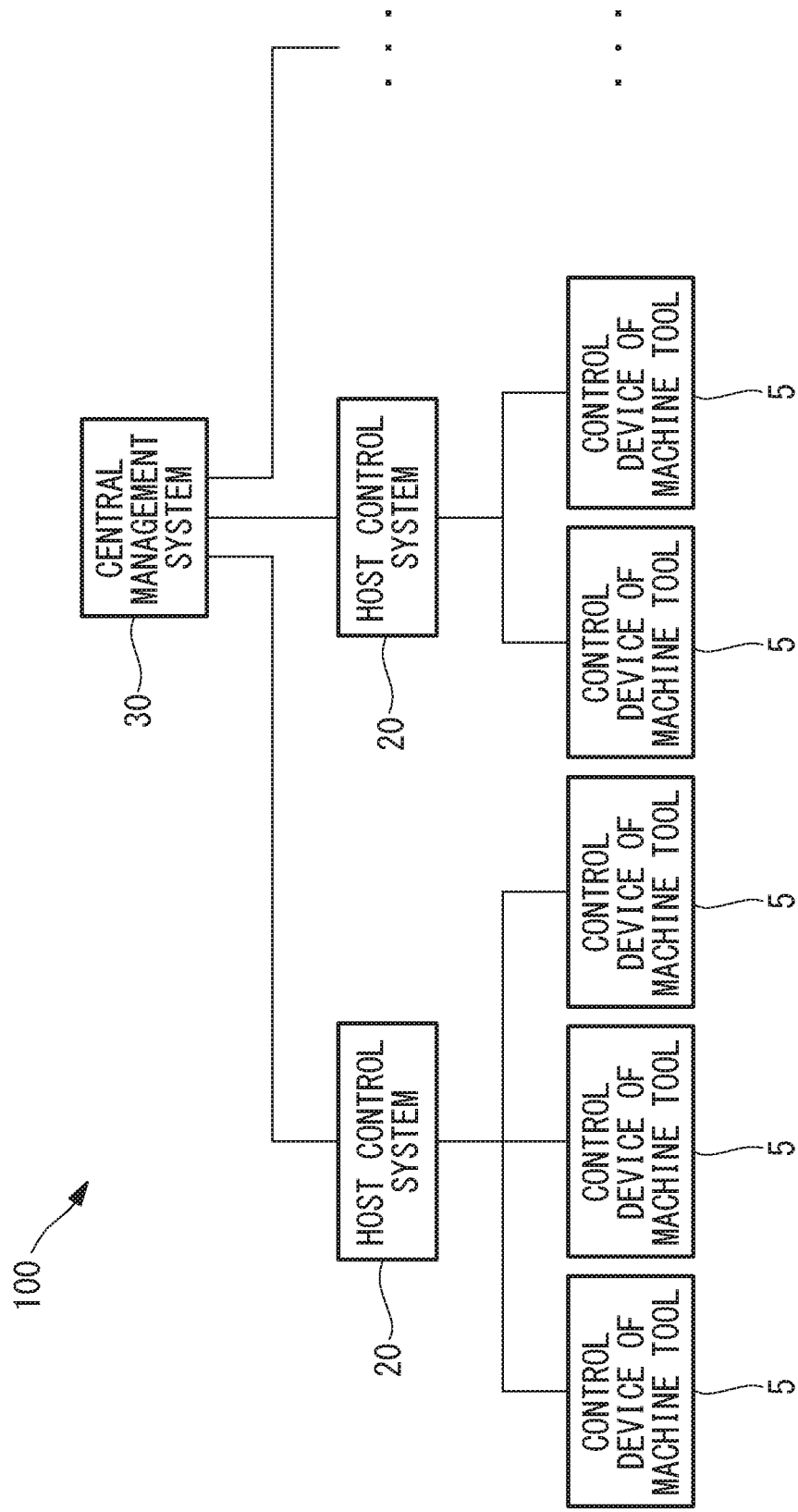

MACHINE TOOL, MANAGEMENT SYSTEM, AND TOOL DETERIORATION DETECTION METHOD

CROSS-REFERENCE TO RELATED APPLICATIONS

This application claims the benefit of Japanese Patent Application No. 2019-007451, the content of which is incorporated herein by reference.

TECHNICAL FIELD

The present invention relates to a machine tool, a management system, and a tool deterioration detection method.

BACKGROUND ART

Conventionally, a machine tool including a tool magazine storing multiple tools and having a function of automatically changing the tool to be attached to a spindle has been known (see PTL 1 and 2, for example). PTL 1 describes that breakage of a tool is detected by comparing an image of the tool before machining and an image of the tool after machining. PTL 2 describes that it is determined whether or not a tool attached to a spindle is a normal tool having a predetermined length, and an inspection is made as to whether or not the tool is attached normally.

Additionally, an inspection device that detects gloss of an object and determines the quality of the object on the basis of the gloss has been known (see PTL 3, for example).

CITATION LIST

Patent Literature

{PTL 1}
Japanese Unexamined Patent Application, Publication No. 2015-131357
{PTL 2}
Japanese Unexamined Patent Application, Publication No. 2007-75924
{PTL 3}
Japanese Unexamined Patent Application, Publication No. Hei 9-222361

SUMMARY OF INVENTION

An aspect of the present disclosure is a machine tool including: a tool magazine that stores a plurality of tools; a spindle that holds one of the plurality of tools stored in the tool magazine; a glossiness measurement unit that measures glossiness of a tapered outer surface of a taper shank of each of the plurality of tools; a deterioration determination unit that determines whether or not the tapered outer surface is deteriorated on the basis of the glossiness measured by the glossiness measurement unit; and a notification unit that notifies an operator of deterioration of the tapered outer surface if it is determined by the deterioration determination unit that the tapered outer surface is deteriorated.

BRIEF DESCRIPTION OF DRAWINGS

FIG. 7 is a configuration diagram of a management system according to another embodiment of the present invention.

DESCRIPTION OF EMBODIMENTS

Hereinafter, a machine tool 1 according to an embodiment of the present invention will be described with reference to the drawings.

Figure 1:
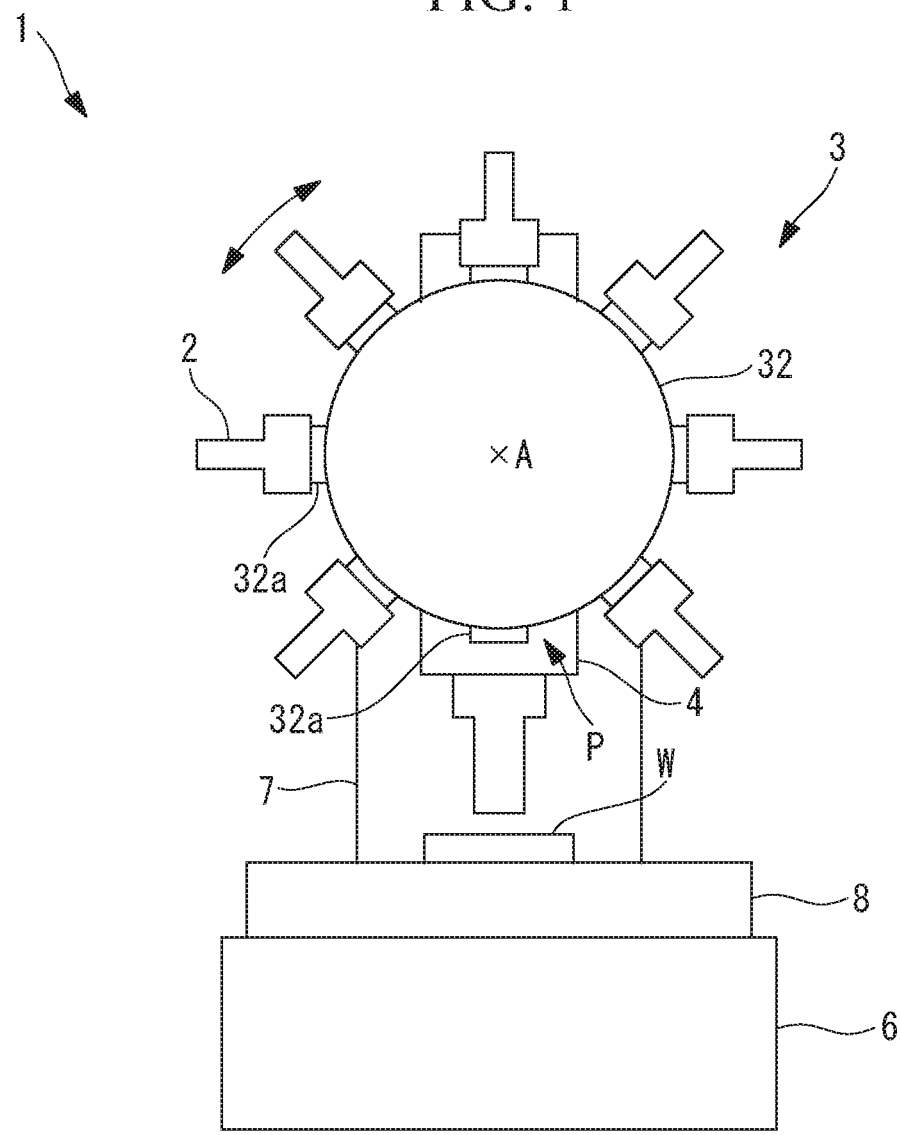
FIG. 1 is a schematic front view of a machine tool according to an embodiment of the present invention.
Figure 2:
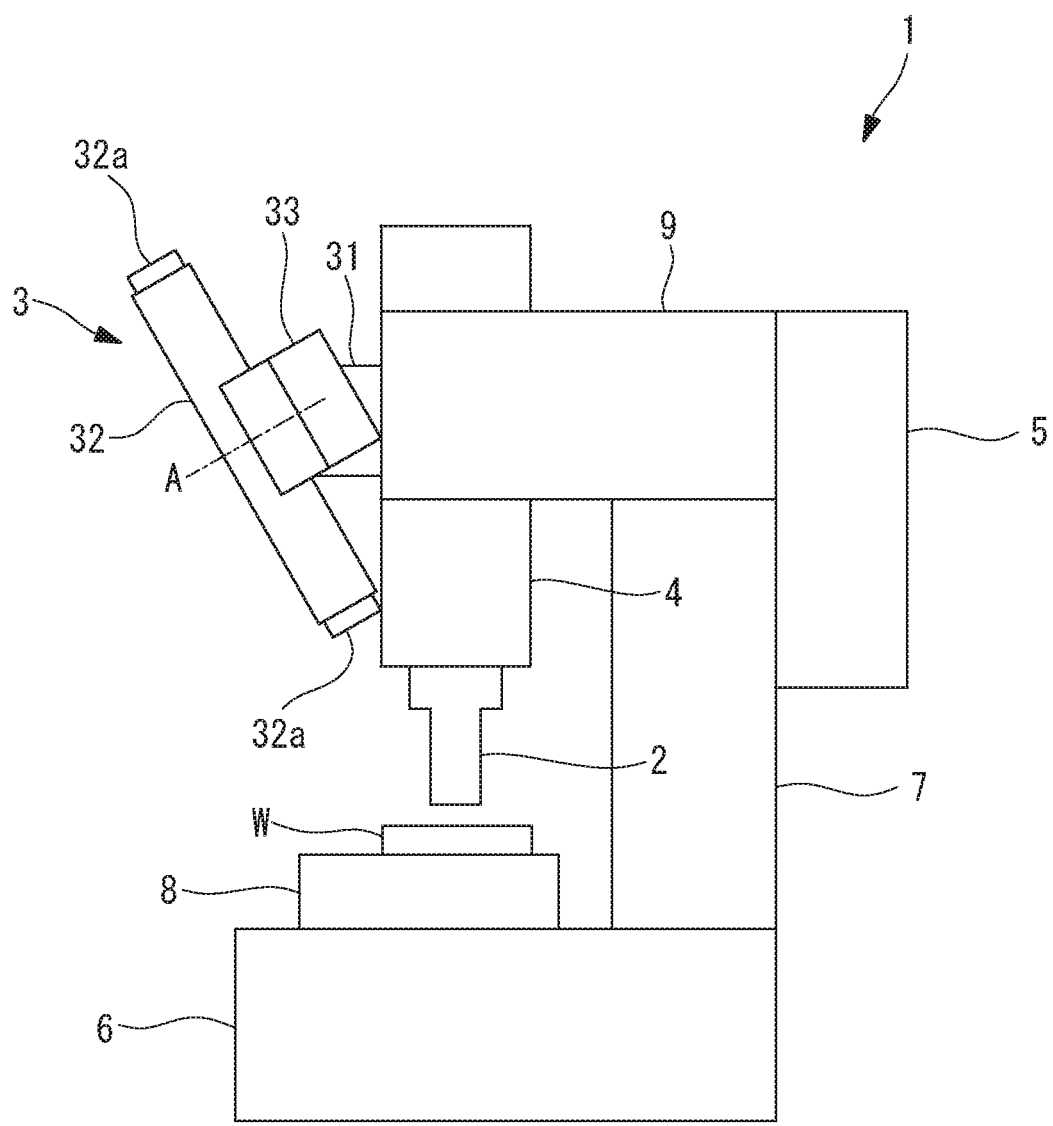
FIG. 2 is a schematic side view of the machine tool of FIG. 1.

As shown in FIGS. 1 and 2, the machine tool 1 according to the embodiment includes a rotary tool magazine 3 storing multiple tools 2, a spindle 4 that holds one of the multiple tools 2 stored in the tool magazine 3, and a control device 5. The spindle 4 is supported to a spindle head 9 so as to be rotatable about the longitudinal axis of the spindle 4. The spindle head 9 is supported in a vertically movable manner by a ball screw, a linear guide, or the like to a column 7 extending vertically upward from a bed 6. The tool magazine 3 is also supported to the column 7. A work W is fixed to a table 8 placed on the bed 6.

The machine tool 1 moves the table 8 and the spindle head 9 relative to each other by a feed motor (not shown) while rotating the spindle 4 about the longitudinal axis of the spindle 4 by a spindle motor (not shown). This moves the work W and the rotating tool 2 relative to each other, and the work W is machined by the rotating tool 2.

Additionally, the machine tool 1 has a function of automatically exchanging the tool 2 between the tool magazine 3 and the spindle 4.

Figure 3:
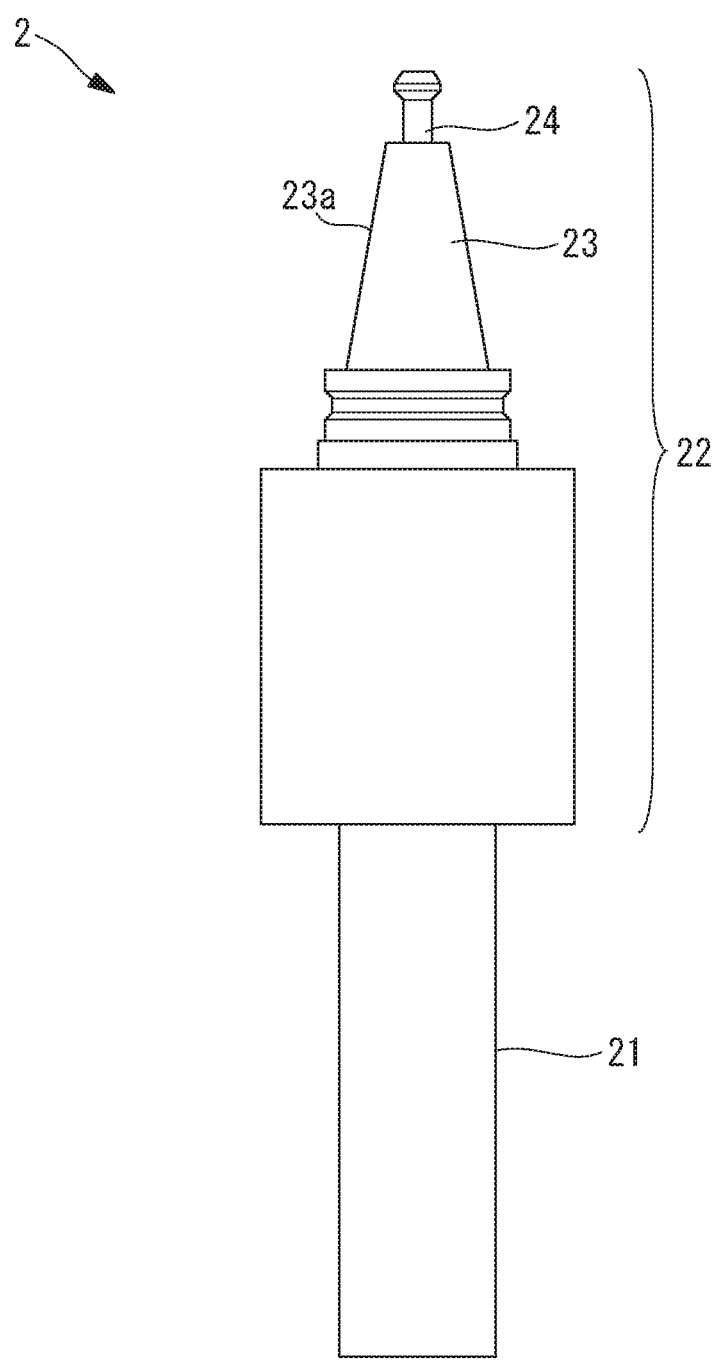
FIG. 3 is a side view of a tool stored in a tool magazine of the machine tool of FIG. 1.

As shown in FIG. 3, the tool 2 has a tool main body 21, and a tool holder 22 that has a taper shank 23 and holds a base end portion of the tool main body 21. The tool main body 21 is a part that comes into contact with the work W and machines the work W, and is an arbitrary type of tool 2 such as a drill, a tap, or a milling. An outer peripheral surface of the taper shank 23 is a cylindrical tapered outer surface 23*a* whose diameter gradually decreases from the tip end side (tool main body 21 side) toward the base end side (opposite side of tool main body 21).

Figure 4:
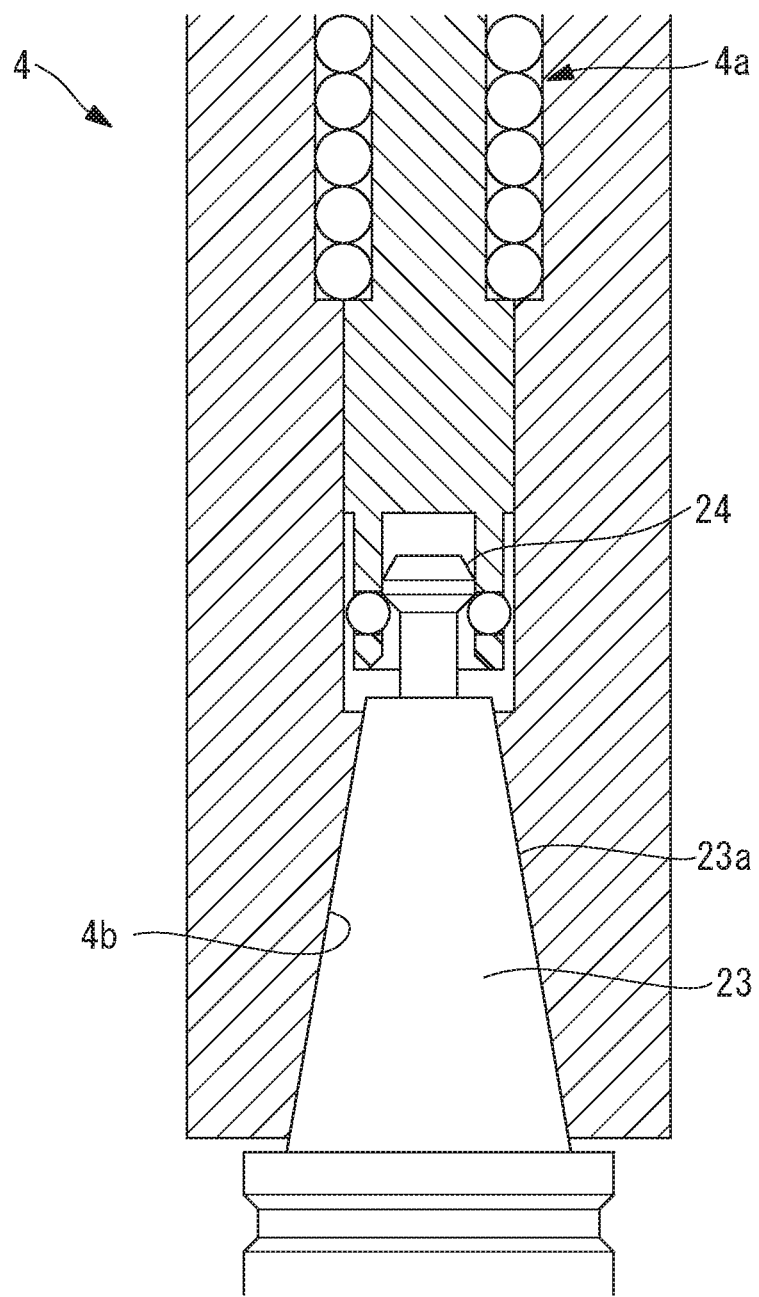
FIG. 4 is a partial longitudinal section of a spindle that holds the tool.

FIG. 4 shows an internal structure of the spindle 4. The tool holder 22 is inserted into a lower end portion inside the spindle 4 along the longitudinal axis of the spindle 4. The spindle 4 holds a pull stud 24 of the base end portion of the tool holder 22 and pulls the pull stud 24 upward by a spring 4*a*. A hole that receives the taper shank 23 along the longitudinal axis is provided in the lower end portion of the spindle 4, and an inner surface of the hole is a tapered inner surface 4*b* having a shape complementary to the tapered outer surface 23*a*. Both the tapered outer surface 23*a* and the tapered inner surface 4*b* are extremely smooth mirror finished surfaces. The tool 2 is firmly fixed to the spindle 4 by bringing the tapered outer surface 23*a* of the taper shank 23 in the hole into close contact with the tapered inner surface 4*b* by a pulling force of the spring 4*a*.

The tapered outer surface 23*a* deteriorates with use of the tool 2. For example, chips generated from machining of the work W may attach to the tapered outer surface 23*a*, or some machining conditions of the work W may cause the tool 2 to vibrate largely during machining, whereby indentations may be formed on the tapered outer surface 23a.

The tool magazine 3 has a fixing portion 31, a rotary portion 32 rotatable about a predetermined rotary axis A with respect to the fixing portion 31, and a rotation motor 33 provided in the fixing portion 31 to rotate the rotary portion 32. The fixing portion 31 is fixed to an upper end portion of the column 7, and supports the rotary portion 32 so as to rotate about the rotary axis A. The rotary portion 32 has multiple tool holders 32a arranged in the circumferential direction about the predetermined rotary axis A and each capable of holding the tool 2. With rotation of the rotary portion 32, one of the multiple tool holders 32a is positioned in a predetermined tool change position. The machine tool 1 changes the tool 2 held in the spindle 4, by exchanging the tool 2 between the tool holder 32a in the tool change position and the spindle 4.

Figure 5:
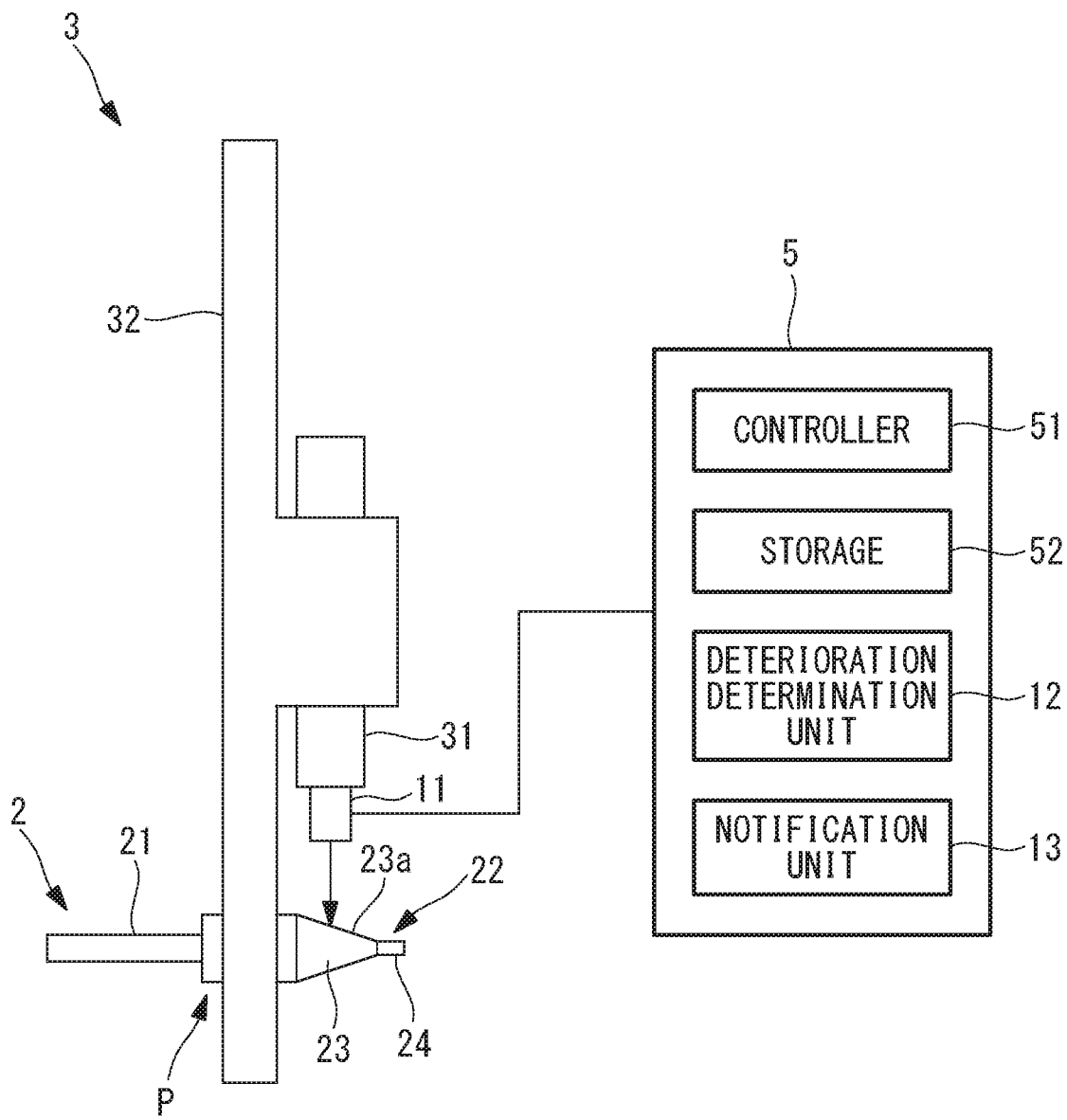
FIG. 5 is a diagram showing the arrangement of a glossiness sensor and an internal structure of a control device of the machine tool of FIG. 1.

The control device 5 has a controller 51 that has a processor, and a storage 52 that has a RAM, a ROM, a nonvolatile memory, and the like (see FIG. 5). The storage 52 stores a program necessary for operation of the machine tool 1. The controller 51 transmits a control signal to each motor of the machine tool 1 according to the program, whereby the aforementioned machining of the work W and exchange of the tool 2 is achieved.

Additionally, as shown in FIG. 5, the machine tool 1 includes a glossiness sensor (glossiness measurement unit) 11 that measures the glossiness of the tapered outer surface 23a of the taper shank 23 of the tool 2, a deterioration determination unit 12 that determines whether or not the tapered outer surface 23a is deteriorated on the basis of the glossiness measured by the glossiness sensor 11, and a notification unit 13 that notifies an operator of deterioration of the tapered outer surface 23a when the deterioration determination unit 12 determines that the tapered outer surface 23a is deteriorated. In FIG. 5, the tool holder 32a is omitted, and of the multiple tools 2, only the tool 2 in a measurement position P is shown for the sake of simplicity of the drawing. The glossiness sensor 11 is connected to the control device 5, and the deterioration determination unit 12 and the notification unit 13 are provided in the control device 5.

The glossiness sensor 11 is placed inside the tool magazine 3, and measures the glossiness of the tapered outer surface 23a of the tool 2 stored in the tool magazine 3. Specifically, the glossiness sensor 11 is fixed to the fixing portion 31 in a center portion of the tool magazine 3, and measures the glossiness of the tapered outer surface 23a of the tool 2 placed in the predetermined measurement position P. With rotation of the rotary portion 32, one of the multiple tool holders 32a is placed in the measurement position P. The measurement position P may be the tool change position. Based on a control signal from the controller 51, the glossiness sensor 11 measures the glossiness of the tapered outer surface 23a of the tool 2 that is placed in the measurement position P by rotation of the rotary portion 32. Information on the measured glossiness is transmitted from the glossiness sensor 11 to the deterioration determination unit 12.

For example, the glossiness sensor 11 emits measurement light toward the tapered outer surface 23a, receives the measurement light mirror-reflected by the tapered outer surface 23a, and calculates the glossiness on the basis of the amount of received measurement light. If there is even a slight deterioration in the measurement light emission area on the tapered outer surface 23a, the reflection direction of measurement light varies, or the reflectivity of measurement light is reduced. Hence, the glossiness measured by the glossiness sensor 11 is highly responsive, and is reduced by even a slight deterioration of the tapered outer surface 23a.

Note that other types of sensors capable of measuring glossiness may be used as the glossiness measurement unit.

The deterioration determination unit 12 compares the glossiness received from the glossiness sensor 11 with a predetermined threshold. If the glossiness is greater than the predetermined threshold, the deterioration determination unit 12 determines that the tapered outer surface 23a is not deteriorated. On the other hand, if the glossiness is equal to or less than the predetermined threshold, the deterioration determination unit 12 determines that the tapered outer surface 23a is deteriorated. The deterioration determination unit 12 transmits a deterioration detection signal to the notification unit 13 only when it determines that the tapered outer surface 23a is deteriorated. Such a deterioration determination unit 12 is implemented by a processor, for example.

In response to the deterioration detection signal from the deterioration determination unit 12, the notification unit 13 notifies the operator of deterioration of the tapered outer surface 23a. The notification unit 13 is a display that displays an alarm display, or an alarm unit that gives an alarm sound. In order for the operator to easily identify the tool 2 whose deterioration on the tapered outer surface 23a is detected, the notification unit 13 may show an identification number of the tool holder 32a placed in the measurement position, on the display.

Next, an operation of the machine tool 1 will be described.

According to the machine tool 1 of the embodiment, with rotation of the rotary portion 32, one of the multiple tool holders 32a of the tool magazine 3 is placed in the tool change position. Then, tool 2 is passed to the spindle 4 from the tool holder 32a in the tool change position, and the tool 2 is attached to the spindle 4. Thereafter, the work W on the table 8 is machined by the tool 2 attached to the spindle 4.

The tool 2 attached to the spindle 4 is exchanged with another tool 2 stored in the tool magazine 3 depending on the type of machining of the work W. That is, the tool 2 is passed to the empty tool holder 32a in the tool change position from the spindle 4, another tool holder 32a is placed in the tool change position by rotation of the rotary portion 32, and the other tool 2 is passed to the spindle 4 from the other tool holder 32a.

Here, during rotation of the rotary portion 32, presence or absence of deterioration on the tapered outer surface 23a of the tool 2 stored in the tool magazine 3 is detected according to the following tool deterioration detection method.

That is, when the tool 2 in the measurement position P is replaced by rotation of the rotary portion 32, the controller 51 causes the glossiness sensor 11 to measure the glossiness of the tapered outer surface 23a of the tool 2 in the measurement position P. Next, the deterioration determination unit 12 determines whether or not the tapered outer surface 23a is deteriorated on the basis of the measured glossiness. If it is determined that the tapered outer surface 23a is deteriorated, the notification unit 13 then notifies the operator of deterioration of the tapered outer surface 23a.

Thus, the operator can know that the tapered outer surface 23a of the tool 2 in the measurement position P is deteriorated, according to the notification by the notification unit 13.

The glossiness sensor 11 may measure the glossiness of the tapered outer surface 23a of the tool 2 passing through the measurement position P during rotation of the rotary portion 32. With this configuration, it is possible to detect deterioration of the tapered outer surface 23a of multiple tools 2 at once. The rotary portion 32 may be rotated at low speed for accurate measurement of the glossiness of the tapered outer surface 23a by the glossiness sensor 11.

As has been described, according to the embodiment, deterioration of the tapered outer surface 23a is detected on the basis of the glossiness of the tapered outer surface 23a. As mentioned earlier, glossiness is highly responsive, and is reduced by even a slight deterioration of the tapered outer surface 23a. Accordingly, even a slight amount of chips attached to the tapered outer surface 23a, or a minute scratch, indentation, or the like on the tapered outer surface 23a is detected by the deterioration determination unit 12. Hence, deterioration of the tapered outer surface 23a can be found at an early stage.

Additionally, a deteriorated tapered outer surface 23a may cause deterioration in the tapered inner surface 4b of the spindle 4, and furthermore, deterioration of the tapered inner surface 4b may cause deterioration in the tapered outer surface 23a of other tools 2. For example, when one tool 2 is held by the spindle 4, asperities such as scratches or indentations formed on the tapered outer surface 23a of the one tool 2 are transferred to the tapered inner surface 4b by close contact between the tapered outer surface 23a and the tapered inner surface 4b. Then, when another tool 2 is held by the spindle 4, the asperities on the tapered inner surface 4b are transferred to the tapered outer surface 23a of the other tool 2.

According to the embodiment, since deterioration of the tapered outer surface 23a is found at an early stage and notified to the operator, the operator can remove the tool 2 having the deteriorated tapered outer surface 23a from the tool magazine 3 before the deteriorated tapered outer surface 23a causes deterioration in the tapered inner surface 4b of the spindle 4 and the tapered outer surface 23a of other tools 2. Hence, it is possible to prevent deterioration of the tapered inner surface 4b of the spindle 4.

In the above embodiment, the glossiness of the tapered outer surface 23a is measured by the glossiness sensor 11 at the timing of exchanging the tool 2 to be attached to the spindle 4. However, the measurement of glossiness by the glossiness sensor 11 may be done at any timing.

For example, the controller 51 may cause the glossiness sensor 11 to measure glossiness according to a preset schedule, such as before or after machining of the work W, or at a fixed time. In this case, presence or absence of deterioration on the tapered outer surface 23a may be determined for all of the tools 2 stored in the tool magazine 3, by positioning multiple tools 2 in the measurement position P in sequence by rotation of the rotary portion 32, and measuring the glossiness of the tapered outer surface 23a of multiple tools 2 by the glossiness sensor 11 in sequence.

In the above embodiment, the tool holder 32a may be provided with a rotation mechanism that rotates the tool 2 about the longitudinal axis of the tool 2.

By measuring the glossiness of the tapered outer surface 23a with the glossiness sensor 11 while rotating the tool 2 with the rotation mechanism, it is possible to measure the glossiness over the entire surface of the tapered outer surface 23a.

In the above embodiment, a single glossiness sensor 11 is used to measure the glossiness of the tapered outer surface 23a of multiple tools 2 stored in the tool magazine 3. Instead, multiple glossiness sensors 11 may be arranged in the tool magazine 3. In this case, the glossiness of the tapered outer surface 23a of the tools 2 held by multiple tool holders 32a placed in multiple measurement positions may be measured simultaneously by multiple glossiness sensors 11.

While the glossiness sensor 11 is placed inside the tool magazine 3 in the above embodiment, the installation position of the glossiness sensor 11 can be changed arbitrarily, as long as the glossiness of the tapered outer surface 23a of the tool 2 can be measured.

Figure 6:
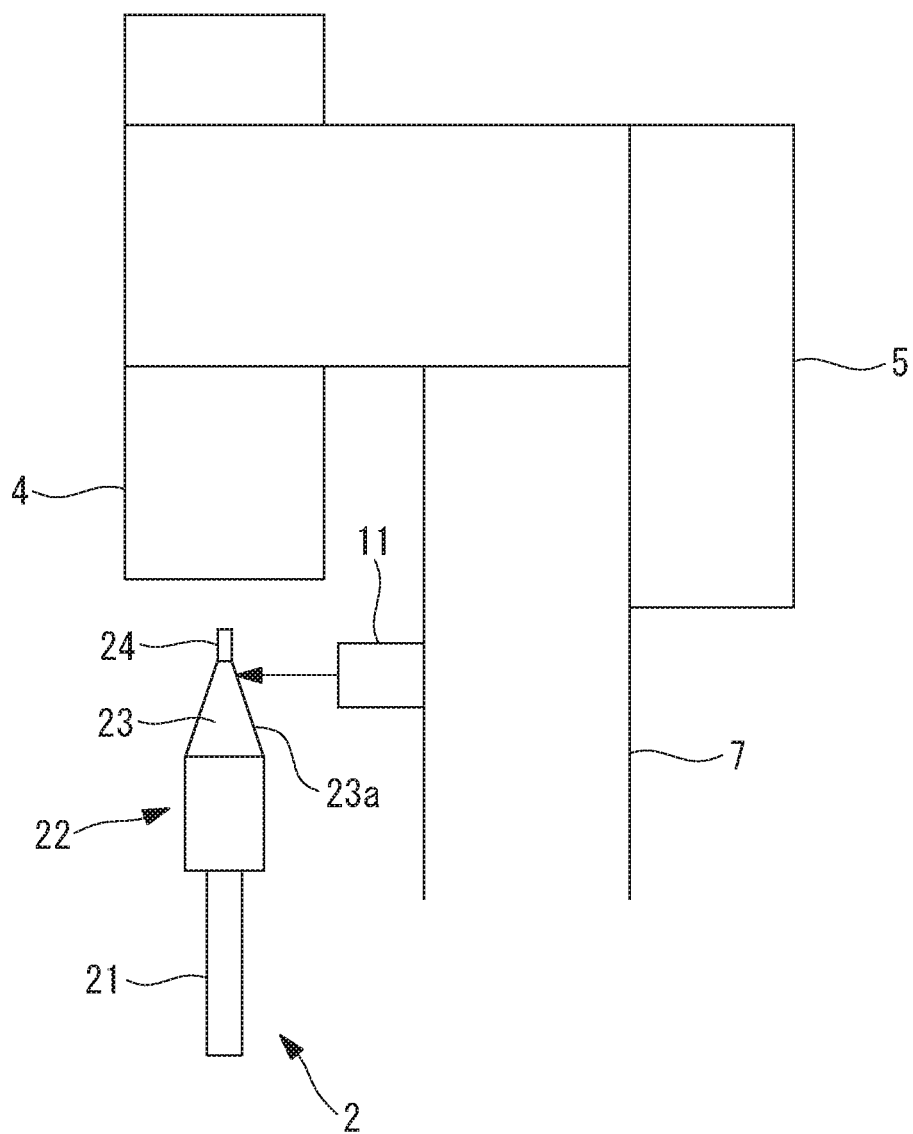
FIG. 6 is a diagram showing a modification of the arrangement of the glossiness sensor.

FIG. 6 shows a modification of the arrangement of the glossiness sensor 11. As shown in FIG. 6, a glossiness sensor 11 may be fixed to the periphery of a spindle 4. In the example of FIG. 6, the glossiness sensor 11 is fixed to a column 7 supporting a spindle head 9. When a tool 2 is passed between a tool magazine 3 and the spindle 4, the tool 2 moves relative to the spindle 4 in a direction extending along the longitudinal axis of the spindle 4.

The glossiness sensor 11 sequentially measures the glossiness of a tapered outer surface 23a of the tool 2 moving relative to the spindle 4 when passing the tool 2, to thereby measure the glossiness in certain positions from the lower end to the upper end of the tapered outer surface 23a. A deterioration determination unit 12 compares the glossiness of each position in the tapered outer surface 23a with a predetermined threshold, and if the glossiness is equal to or less than the predetermined threshold in at least one position, determines that the tapered outer surface 23a is deteriorated. Thus, presence or absence of deterioration can be determined for a wide area of the tapered outer surface 23a.

In another modification of the arrangement of the glossiness sensor 11, a glossiness sensor 11 may be provided in a tool holder 32a. In this case, it is preferable that the glossiness sensor 11 be provided in all of the tool holders 32a.

While the deterioration determination unit 12 detects deterioration on the basis of the value of glossiness in the above embodiment, deterioration may instead be detected on the basis of the amount of change in glossiness over time.

For example, the glossiness of the tool 2 measured by the glossiness sensor 11 is stored in the storage 52 in time series, in association with the identification number of the tool holder 32a holding the tool 2. When the glossiness of the tapered outer surface 23a of the tool 2 is newly measured by the glossiness sensor 11, the deterioration determination unit 12 acquires the glossiness of the same tool 2 from a previous measurement from the storage 52 according to the identification number, and calculates the amount of change between the current glossiness and the previous glossiness of the tool 2 as a temporal change amount. Then, if the temporal change amount is equal to or greater than a predetermined threshold, the deterioration determination unit 12 determines that the tapered outer surface 23a is deteriorated, and transmits a deterioration detection signal to the notification unit 13.

If the temporal change amount of glossiness is large, there may be some anomaly in the use state of the tool 2 or in the spindle 4. Hence, with reference to the temporal change amount in glossiness, not only deterioration of the tapered outer surface 23a, but also a possible anomaly in the use state of the tool 2 or in the spindle 4 can be detected at an early stage.

The glossiness sensor 11 may measure the glossiness of the tapered outer surface 23a of the tool 2 in the tool change position before being passed to the spindle 4 and after being returned from the spindle 4, and the deterioration determination unit 12 may calculate the amount of change between the two glossinesses as a temporal change amount.

If the glossiness of the tapered outer surface 23a drops largely after a single use of the tool 2, it is highly probable that there is some anomaly in the spindle 4. Hence, it is possible to detect an anomaly in the spindle 4 at an early stage and notify the operator, by referring to the amount of change in glossiness before and after use of the tool 2.

In the above embodiment, the predetermined threshold as the reference for detecting deterioration of the tapered outer surface 23*a* may be set according to the required machining accuracy of the work W.

The allowable range of deterioration of the tapered outer surface 23*a* varies depending on the required machining accuracy of the work W. By setting the predetermined threshold in the above manner, deterioration of the tapered outer surface 23*a* can be determined more appropriately.

For example, an association table in which machining accuracy and thresholds are associated with each other is stored in the storage 52. In the association table, the higher the required machining accuracy, the higher the predetermined threshold. The controller 51 calculates the machining accuracy on the basis of the content of machining of the work W, acquires the threshold associated with the machining accuracy in the association table from the storage 52, and sets the acquired threshold as a reference for the deterioration determination unit 12 to determine presence or absence of deterioration.

In the above embodiment, learning data regarding the relationship between the glossiness measured by the glossiness sensor 11 and machining quality of the work W may be stored in the storage 52, and the controller (learning unit) 51 may use the learning data stored in the storage 52 to learn the threshold as the reference for determining whether or not the tapered outer surface 23*a* is deteriorated.

For example, after machining of the work W by the machine tool 1, the quality of the machined work W is evaluated by an inspection device or the operator, and the evaluation result is input into the control device 5. Then, in the control device 5, the input evaluation result is stored in the storage 52 in association with the glossiness of the tapered outer surface 23*a* of the tool 2 used for the machining of the work W. Learning data regarding multiple works W is accumulated in the storage 52. The controller 51 learns by use of the learning data accumulated in the storage 52, and thereby obtains the optimal threshold for achieving good machining quality. The deterioration determination unit 12 uses the optimal threshold obtained by learning to detect deterioration of the tapered outer surface 23*a*.

The learning result of the machine tool 1 may be shared with another machine tool 1. That is, the machine tool 1 may be capable of communicating with another machine tool, and may transmit the learning result to the other machine tool. Additionally, the machine tool 1 may receive a learning result of another machine tool from the other machine tool. The learning result contains the aforementioned learning data.

As shown in FIG. 7, the machine tool 1 may be an edge device of a management system 100. The management system 100 includes multiple machine tools 1, and a host control system 20 capable of communicating with control devices 5 of the multiple machine tools 1. The host control system 20 is a production management system, a shipment management system, a department management system, or the like. The management system 100 may further include a central management system 30 connected to each of the multiple host control systems 20.

Each of the host control system 20 and the central management system 30 has a controller having a processor or the like, a display, a storage having a nonvolatile storage, a ROM, a RAM, and the like, and an input device such as a keyboard, a touch panel, or an operator's panel, for example.

The host control system 20 may receive a learning result from each of the control devices 5 of the multiple machine tools 1, accumulate the received learning results in a storage, compile the accumulated learning results, and transmit the compiled learning result to each control device 5. With this configuration, learning data held by each control device 5 is shared among multiple control devices 5. Hence, each control device 5 can learn the optimal threshold with higher efficiency and accuracy.

Instead, the host control system 20 may learn the optimal threshold by using the compiled learning result, and transmit the obtained optimal threshold to each control device 5. With this configuration, the optimal threshold provided by the host control system 20 can be used to optimize the threshold even in a machine tool 1 whose control device 5 does not have a learning function.

REFERENCE SIGNS LIST

1 machine tool
2 tool
23 taper shank
23*a* tapered outer surface
3 tool magazine
31 fixing portion
32 rotary portion
32*a* tool holder
4 spindle
5 control device
51 controller (learning unit)
52 storage
11 glossiness sensor
12 deterioration determination unit
13 notification unit
20 host control system
100 management system
A rotary axis
P measurement position
W work

The invention claimed is:

1. A machine tool comprising:
   a tool magazine that stores a plurality of tools;
   a spindle that holds one of the plurality of tools stored in the tool magazine;
   a glossiness measurement unit that measures glossiness of a tapered outer surface of a taper shank of each of the plurality of tools;
   a deterioration determination unit that determines whether or not the tapered outer surface is deteriorated on the basis of the glossiness measured by the glossiness measurement unit; and
   a notification unit that notifies an operator of deterioration of the tapered outer surface if it is determined by the deterioration determination unit that the tapered outer surface is deteriorated.

2. The machine tool according to claim 1, wherein
   the deterioration determination unit determines that the tapered outer surface is deteriorated if the glossiness measured by the glossiness measurement unit is equal to or less than a predetermined threshold.

3. The machine tool according to claim 2, wherein
   the predetermined threshold is set depending on a required machining accuracy of a work.

4. The machine tool according to claim 1, wherein
the deterioration determination unit determines that the tapered outer surface is deteriorated if a temporal change amount of the glossiness measured by the glossiness measurement unit is equal to or greater than a predetermined threshold.

5. The machine tool according to claim 1, wherein
the tool magazine has a fixing portion, and a rotary portion rotatable about a predetermined rotary axis with respect to the fixing portion, the rotary portion having a plurality of tool holders arranged in a circumferential direction about the predetermined rotary axis, and
the glossiness measurement unit is fixed to the fixing portion, and measures the glossiness of the tapered outer surface of a tool of the plurality of tools that is placed in a predetermined measurement position by rotation of the rotary portion.

6. The machine tool according to claim 1, wherein
the glossiness measurement unit is fixed to the periphery of the spindle, and measures the glossiness of the tapered outer surface of a tool of the plurality of tools that moves relative to the spindle in a direction along a longitudinal axis of the spindle while the tool is passed between the tool magazine and the spindle.

7. The machine tool according to claim 1 further comprising
a storage that stores learning data regarding a relationship between glossiness measured by the glossiness measurement unit and machining quality of a work, and
a learning unit that uses the learning data stored in the storage to learn a reference for determining whether or not the tapered outer surface is deteriorated.

8. A management system comprising
a plurality of machine tools according to claim 1, and
a host control system capable of communicating with each of the plurality of machine tools.

9. The management system according to claim 8, wherein
the host control system
receives learning data regarding a relationship between glossiness measured by the glossiness measurement unit and machining quality of a work from each of the plurality of machine tools and accumulates the learning data, and
uses the accumulated learning data to learn a reference for determining whether or not the tapered outer surface is deteriorated.

10. The management system according to claim 8, wherein
each of the plurality of machine tools includes
a storage that stores learning data regarding a relationship between glossiness measured by the glossiness measurement unit and machining quality of a work, and
a learning unit that uses the learning data stored in the storage to learn a reference for determining whether or not the tapered outer surface is deteriorated, and
the host control system receives a learning result of the learning unit from each of the plurality of machine tools and accumulates the learning results.

* * * * *